United States Patent
Yu et al.

(10) Patent No.: US 11,090,638 B2
(45) Date of Patent: Aug. 17, 2021

(54) SILICA CONTAINING ALUMINA SUPPORTS, CATALYSTS MADE THEREFROM AND PROCESSES USING THE SAME

(71) Applicant: Advanced Refining Technologies LLC, Columbia, MD (US)

(72) Inventors: Xianghua Yu, Lisle, IL (US); Bruno C. Nesci, Oak Lawn, IL (US); Roberto Romero, Joliet, IL (US); Gill M. Malick, Orland Park, IL (US); Jifei Jia, El Cernto, CA (US); Cecelia A. Radlowski, Riverside, IL (US)

(73) Assignee: Advanced Refining Technologies LLC, Columbia, MD (US)

( * ) Notice: Subject to any disclaimer, the term of this patent is extended or adjusted under 35 U.S.C. 154(b) by 724 days.

(21) Appl. No.: 14/367,449

(22) PCT Filed: Nov. 20, 2012

(86) PCT No.: PCT/US2012/066107
§ 371 (c)(1),
(2) Date: Jun. 20, 2014

(87) PCT Pub. No.: WO2013/095856
PCT Pub. Date: Jun. 27, 2013

(65) Prior Publication Data
US 2014/0367311 A1    Dec. 18, 2014

Related U.S. Application Data (60) Provisional application No. 61/587,872, filed on Jan. 18, 2012, provisional application No. 61/579,357, filed on Dec. 22, 2011.

(51) Int. Cl.
*B01J 27/19*    (2006.01)
*C10G 45/04*    (2006.01)
(Continued)

(52) U.S. Cl.
CPC ............... *B01J 27/19* (2013.01); *B01J 21/12* (2013.01); *B01J 35/1019* (2013.01);
(Continued)

(58) Field of Classification Search
CPC ........ B01J 21/12; B01J 27/19; B01J 35/1019; B01J 35/1042; B01J 35/1061;
(Continued)

(56) References Cited

U.S. PATENT DOCUMENTS

| 4,124,536 A | 11/1978 | Itoh et al. |
| 4,530,753 A | 7/1985 | Shiroto et al. |

(Continued)

FOREIGN PATENT DOCUMENTS

| CA | 2508605 C | 11/2011 |
| CN | 1769385 A | 5/2006 |

(Continued)

OTHER PUBLICATIONS

Hattori et al., "New catalyst chemistry", Apr. 1988.
(Continued)

*Primary Examiner* — Derek N Mueller
(74) *Attorney, Agent, or Firm* — Lerner, David, Littenberg, Krumholz & Mentlik, LLP (57) ABSTRACT

Alumina support compositions comprising at least 0.1 wt % of silica are disclosed. The alumina support are characterized by a pore volume of greater than 0.60 cc/g, a median pore size ranging from about 70 to about 120, a pore size distribution such that at least 90% of the total pore volume falls within the range of about 20 to about 250, and a pore size distribution width of no less than about 40. Alumina compositions of the present invention exhibit a primary peak mode at a pore diameter less than the median pore diameter.

(Continued)

Nitrogen pore size distribution of Examples 1 – 4.

Also provided are catalysts made from the alumina supports, and processes of preparing and using the supports and catalysts.

11 Claims, 6 Drawing Sheets

(51) Int. Cl.
  *B01J 35/10* (2006.01)
  *B01J 37/02* (2006.01)
  *B01J 21/12* (2006.01)
  *C10G 45/12* (2006.01)

(52) U.S. Cl.
  CPC ....... *B01J 35/1042* (2013.01); *B01J 35/1061* (2013.01); *B01J 37/0201* (2013.01); *B01J 37/0207* (2013.01); *C10G 45/04* (2013.01); *C10G 45/12* (2013.01)

(58) Field of Classification Search
  CPC ... B01J 37/0201; B01J 37/0207; C10G 45/04; C10G 45/12
  See application file for complete search history.

(56) References Cited

U.S. PATENT DOCUMENTS

| | | | |
|---|---|---|---|
| 4,555,394 | A | 11/1985 | Asaoka et al. |
| 4,562,059 | A | 12/1985 | Asaoka et al. |
| 4,652,545 | A | 3/1987 | Lindsley et al. |
| 4,837,193 | A | 6/1989 | Akizuki et al. |
| 4,941,964 | A | 7/1990 | Dai et al. |
| 5,334,307 | A | 8/1994 | Simpson et al. |
| 5,397,456 | A | 3/1995 | Dai et al. |
| 5,928,499 | A | 7/1999 | Sherwood, Jr. et al. |
| 5,944,983 | A | 8/1999 | Hayashi et al. |
| 5,989,515 | A | 11/1999 | Watanabe et al. |
| 6,589,908 | B1 | 7/2003 | Ginestra et al. |
| 6,872,685 | B2 | 3/2005 | Timken |
| 6,984,310 | B2 | 1/2006 | Ginestra et al. |
| 7,790,652 | B2 | 9/2010 | Ackerman et al. |
| 2003/0125198 | A1 | 7/2003 | Ginestra et al. |
| 2006/0231457 | A1 | 10/2006 | Bhan |
| 2006/0231547 | A1 | 10/2006 | Ferguson |
| 2009/0038993 | A1 | 2/2009 | Gabrielov et al. |
| 2009/0255851 | A1 | 10/2009 | Bhan et al. |
| 2010/0243526 | A1 | 9/2010 | Ginestra et al. |
| 2012/0175285 | A1 | 7/2012 | Bhan et al. |

FOREIGN PATENT DOCUMENTS

| | | | |
|---|---|---|---|
| CN | 101808732 | A | 8/2010 |
| CN | 102039197 | A | 5/2011 |
| JP | S54037163 | B2 | 11/1979 |
| JP | S57123290 | A | 7/1982 |
| JP | S57205484 | A | 12/1982 |
| JP | S6119301 | B2 | 5/1986 |
| JP | S62177423 | A | 8/1987 |
| JP | H01103697 | A | 4/1989 |
| JP | H11189409 | A | 7/1999 |
| JP | 2001334150 | A | 12/2001 |
| JP | 2004043579 | A | 2/2004 |
| JP | 2004523340 | A | 8/2004 |
| JP | 2005015323 | A | 1/2005 |
| JP | 2006509084 | A | 3/2006 |
| JP | 2010535620 | A | 11/2010 |
| JP | 2011518663 | A | 6/2011 |
| JP | 2012520765 | A | 9/2012 |
| JP | 2013527019 | A | 6/2013 |
| JP | 2013535330 | A | 9/2013 |
| JP | 2013537100 | A | 9/2013 |
| JP | 2013538120 | A | 10/2013 |
| WO | 2004052534 | A1 | 6/2004 |
| WO | 2009020913 | A2 | 2/2009 |
| WO | 2010107908 | A1 | 9/2010 |
| WO | 2011056918 | A1 | 5/2011 |
| WO | 2012021386 | A1 | 2/2012 |
| WO | 2012021387 | A2 | 2/2012 |
| WO | 2012021389 | A1 | 2/2012 |
| WO | 2013095856 | A1 | 6/2013 |

OTHER PUBLICATIONS

Catalyst Design, Catalyst Lecture vol. 5 (Engineering part 1, Catalysis Society of Japan Dec. 10, 1985.
Search Report for Taiwan Application No. 101147971 dated Mar. 23, 2017.
International Search Report for Application No. PCT/US12/66107 dated Jan. 29, 2013.
Argument in Response in Opposition No. 2017-701104 against JP Appl. No. 2014-549065, dated May 31, 2018, 10 pages.
Decision to maintain patent in Opposition No. 2017-701104 against JP Appl. No. 2014-549065, dated Sep. 3, 2018, 28 pages.
Demand for Correction in Opposition No. 2017-701104 against JP Appl. No. 2014-549065, dated May 31, 2018, 57 pages.
Hattori, Hideshi, et al., Atarashii Shokubaikagaku, New Catalyst Chemistry, Sankyo Shuppan Co., Ltd., May 10, 1990, pp. 173-174; 4 pages.
International Chemical Safety Card, Ferric Oxide,—ICSC No. 15 77, National Institute of Health Sciences, the webpage (http://www.nihs.go.jp/ICSC/icssj-c/icss 1577c.html) accessed on Oct. 26, 2016, 2 pages.
Notice of Reasons for Cancellation of Patent in Opposition No. 2017-701104 against JP Appl. No. 2014-549065, dated Feb. 27, 2018, 11 pages.
Opposition No. 2017-701104 against JP Appl. No. 2014-549065 dated Nov. 24, 2017, 110 pages.
Shokubaikouza vol. 5, Kougakuhen 1, Shokubaisekkei: Lectures on Catalysts vol. 5, Engineering Science, Part 1, Catalyst Design, Catalysis Society of Japan (Ed.), Kodansha Ltd., Dec. 10, 1985, pp. 72-73, 77-79 and 94; 8 pages.
Taiwanese Search Report for TW Application No. 101147971, dated Sep. 6, 2018.
Tanabe, Kouzou, et al., Kinzokusankabutsu to Fukugosankabutsu, Metal Oxides and Composite Oxides, Kodansha Ltd., Aug. 10, 1991 (6th edition), pp. 72-74 and p. 84, 6 pages.

Figure 1. Nitrogen pore size distribution of Examples 1 – 4.

Figure 2. Mercury pore size distribution of Examples 1 — 4.

Figure 3. Nitrogen pore size distribution of Comparative Examples 1 – 2.

Figure 4. Mercury pore size distributions of Comparative Examples 1 – 2, and their comparison with Example 1.

Figure 5. Hydrodesulfurization and hydrodenitrogenation activity of Comparative Example 1, catalysts prepared from base with treatment of additives (Examples 1 and 2), and catalyst from base without chemical reagent treatment (Comparative Example 2) for ULSD applications.

Figure 6. Hydrodesulfurization and hydrodenitrogenation activity of Comparative Example 1 and Example 1 for VGO hydrocracker pretreat applications.

SILICA CONTAINING ALUMINA SUPPORTS, CATALYSTS MADE THEREFROM AND PROCESSES USING THE SAME

CROSS-REFERENCE TO RELATED APPLICATIONS

This application claims priority and the benefit of the filing date of U.S. Provisional Patent Application No. 61/579,357 filed Dec. 22, 2011 and Provisional Patent Application No. 61/587,872 filed Jan. 18, 2012, the disclosure of which is hereby incorporated herein by reference.

FIELD OF THE INVENTION

The present invention relates to novel alumina compositions and catalyst supports prepared therefrom. The present invention also relates to hydroprocessing catalysts prepared from the supports, and the use of the catalysts for hydroprocessing of a middle distillate or a heavy hydrocarbon feedstock.

BACKGROUND OF THE INVENTION

The catalytic hydrotreatment of a hydrocarbon feedstock in order to remove impurities such as sulfur, nitrogen, and metal compounds improves or upgrades the feedstock. In a typical hydrotreating process, the hydrocarbon feedstock is contacted in the presence of hydrogen with a hydrotreating catalyst under process conditions that suitably provide for a treated hydrocarbon product. The hydrotreating catalyst used in these processes generally are composed of an active phase that can include a component from the Group VIB metals and a component from the Group VIII metals supported on a porous, refractory inorganic oxide material to prepare catalysts having specified performance characteristics in hydrocarbon processing operations, such as hydrodenitrogenation and hydrodesulfurization processes. Alumina is a preferred support material.

Recent efforts have been directed toward developing supports that enhance the catalytic activity of metals deposited thereon. To this end research has been directed to methods for preparing alumina having various surface areas, pore volumes and pore size distributions which, when appropriate metals are applied, are well suited for catalyzing a desired reaction on a particular feedstock.

Various methods have been proposed for the preparation of alumina. In one method an aqueous slurry containing seed aluminum hydroxide is aged at a pH ranging from 6 to 11 for the growth of the seed crystals by coalescence. This method requires a long period of time to obtain alumina particles of a large size.

U.S. Pat. Nos. 4,562,059 and 4,555,394 disclose a two-stage method for the preparation of alumina wherein an alumina hydrogel is formed from non-crystalline seed aluminum hydroxide in a first stage and the resultant alumina hydrogel is processed for conversion into alumina in a second stage. The alumina produced manifests a uni-modal pore volume distribution as the greater part of its pore volume is contained within a narrow range of pore diameters.

U.S. Pat. Nos. 6,589,908 and 6,984,310 disclose a two-stage addition process for the preparation of alumina. In the first stage seed alumina is produced by precipitation of an aqueous solution of aluminum sulfate and sodium aluminate at a temperature between about 25° C. and about 60° C., at a pH between 3 and 10. The second precipitation is performed between about 50° C. and about 90° C. while maintaining a pH range of about 7 to about 11 to obtain a final slurry product. The slurry product is thereafter washed, dried and extruded. The extrudate is dried and calcined to give the final alumina support. Alumina supports disclosed in these patents exhibit a bimodal pore size distribution pattern, wherein the two modes are separated by 10 to 200 Å, and has a primary pore mode or peak which is larger than the median pore diameter.

U.S. Pat. No. 7,790,652 also discloses a two-stage addition process for the preparation of aluminum. In the first stage, seed alumina is produced by precipitation of an aqueous alkaline solution (e.g. sodium aluminate) with an aqueous acidic solution (e.g. aluminate sulfate) at a temperature range of about 20° C. to about 40° C. Thereafter, the temperature of the first aqueous slurry temperature is raised to the range of about 45° C. to about 70° C. to form a second precipitation aqueous slurry. The pH of the first stage is kept in the range of from about 8 to about 11, while the pH is maintained within the range of 8.5 to 9 during the second stage. The slurry product is thereafter washed, dried, and extruded. The extrudate is dried and calcined to give the final alumina support. The resulting support material has a median pore diameter in the range of from about 110 Å to about 126 Å, a pore size distribution width of less than about 33 Å, and a pore volume of at least about 0.75 cc/g. Alumina compositions disclosed may contain less than 3 wt % silica.

In the hydroprocessing industry, there remains a need for improved alumina compositions which are useful as supports to provide catalysts having enhanced activity to remove sulfur and nitrogen impurities during the hydrotreatment of a middle distillate and/or heavy hydrocarbon feedstock. There also remains a need to provide improved processes for the hydrodesulfurization and hydrodenitrogenation of middle distillate and heavy hydrocarbon feedstocks.

SUMMARY OF THE INVENTION

The present invention provides novel alumina compositions which are particularly suited as a support material for preparing hydrotreating catalyst compositions. Alumina compositions in accordance with this invention comprise at least 0.1 wt % of silica and possess a pore structure such that the greater part of its pore volume is within a narrow range of pore diameters. Catalyst compositions prepared from the alumina compositions of the invention exhibit an increased performance for reducing the content of nitrogen and sulfur from middle distillate and heavy hydrocarbon feedstocks during a hydrotreating process.

In accordance with the invention, silica containing alumina compositions are provided which exhibit a pore structure characterized by a pore volume of greater than 0.60 cc/g, and a median pore size ranging from about 70 Å to about 120 Å. The compositions of the invention possess a pore size distribution such that at least 90% of the total pore volume falls within the range of about 20 Å to about 250 Å, and have a pore size distribution width of about 40 Å or greater. The invention compositions manifest a uni-modal pore structure often exhibiting a shoulder or tailing to the right indicating a diminished secondary peak at a pore diameter greater than a median pore diameter.

The present invention further provides methods of preparing the silica containing alumina compositions having the specified pore structure. In accordance with an embodiment of the invention, the silica containing alumina compositions are prepared by first forming alumina by a two-step addition precipitation process, and thereafter treating the alumina with a silica containing reagent to form the final silica containing alumina composition. In accordance with this embodiment, the alumina product obtained from the two stage addition precipitation process is treated with one or more silica containing reagents in a single or successive addition steps.

The present invention also provides catalyst compositions comprising the silica containing alumina compositions of the invention. In accordance with the invention, the catalyst compositions comprise at least one catalytically active metal and/or metal compounds, and optionally phosphorous, and the silica containing composition. Catalyst compositions of the invention exhibit enhanced hydrodenitrogenation and hydrodesulfurization activities for the hydrotreatment of a middle distillate or heavy hydrocarbon feedstock.

In another embodiment of the invention, an improved process for the hydrodenitrogenation and hydrodesulfurization of a middle distillate and/or a heavy hydrocarbon feedstock containing sulfur and nitrogen is provided.

These and other embodiments, features and advantages of the invention disclosed herein will become apparent from the following detailed description and the appended claims.

DETAILED DESCRIPTION OF THE INVENTION

The present invention is directed to novel alumina compositions which are useful as supports for hydroconversion catalyst which are useful in hydrotreating processes. Alumina compositions of the invention exhibit a novel pore structure characterized by the presence of a majority of its pore volume in pores within a narrow range of pore diameters distributed over a defined range of pore diameters. The alumina compositions of the invention have a high pore volume and a high surface area. It has been found that when used in combination with suitable hydroprocessing catalytic components, the novel alumina compositions of the invention unexpectedly provide enhanced performance for the hydrodesulfurization and hydrodenitrogenation of middle distillate and heavy hydrocarbon feedstocks.

In accordance with the present invention, the alumina compositions comprise a precipitated alumina which comprises at least about 0.1 wt % of $SiO_2$, based on the total weight of the precipitated alumina. In another embodiment of the invention, the precipitated alumina comprises at least 3.0 wt % $SiO_2$, based on the total weight of the precipitated alumina. In yet another embodiment of the invention, the precipitated alumina comprises from about 0.1 wt % to about 15 wt % $SiO_2$, based on the total weight of the precipitated alumina. In still another embodiment of the invention, the precipitated alumina of the invention comprises from 3 wt % to about 10 wt % of $SiO_2$, based on the total weight of the precipitated alumina. The alumina compositions of the invention offer the combination of high surface area, defined pore size distribution and width, and median pore diameter to unexpectedly provide a support useful to prepare a hydrocarbon conversion catalyst having improved hydrodesulfurization and hydrodenitrogenation activity for the treatment of middle distillate and/or heavy hydrocarbon feedstocks.

Unless otherwise specified herein, the pore volume and pore size distribution properties of the silica alumina material as defined herein are determined by mercury penetration porosimetry. The mercury measurement of the pore volume and the pore size distribution of the alumina support material is performed using any suitable mercury porosimeter capable of a pressure range of atmospheric pressure to about 60,000 psi, with a contact angle, $\theta=140°$ with a mercury surface tension of 474 mN/m at 25° C.

Where nitrogen pore size distribution is specified, the nitrogen measurement is performed using any suitable nitrogen porosimeter, such as Micromeritics TriStar 3000, measured by multi-point nitrogen sorption determination.

The term "primary peak mode" is used herein to refer to the peak which occurs at a pore diameter corresponding to the highest point in the pore size distribution plot where incremental pore volume is plotted as a function of pore diameter.

Median pore diameter is calculated either by volume or by surface area. The phrase "median pore diameter calculated by volume" is used herein to indicate the pore diameter above which half of the total pore volume exists, while the phrase "median pore volume calculated by surface area" is used herein to indicate that pore diameter above which half of the total pore surface area exists.

The term "pore size distribution width" is used herein to indicate the smallest range of pore diameters of the pores of the alumina compositions in which is present two-thirds of the total pore volume of the silica containing alumina material.

Alumina compositions of the invention are characterized by a total pore volume of about 0.60 cc/g or greater. In an embodiment of the invention, the alumina compositions of the invention possess a total pore volume of about 0.60 cc/g to about 1.0 cc/g. The compositions of the invention have a median pore diameter ranging from about 70 Å to about 120 Å. In one embodiment, alumina compositions of the invention possess a median pore diameter from about 75 Å to about 95 Å. The pore distribution of the alumina compositions of the invention is further characterized by the presence of at least about 90% of the total pore volume within the range of about 20 Å to about 250 Å. In a preferred embodiment of the invention from about 90% to about 95% of the total pore volume have pores in the range of about 20 Å to about 250 Å. In another embodiment of the invention at least about 90% of the total pore volume have pores in the range of about 50 Å to about 200 Å. In another embodiment of the invention from about 90% to about 95% of the total pore volume have pores in the range of about 50 Å to about 200 Å.

The silica containing alumina compositions of the invention exhibit a single or uni-modal pore volume distribution characteristic in that no more than one maximum can be observed when the incremental pore volume of the prepared alumina is plotted as a function of pore diameter. Compositions in accordance with the present invention exhibit a primary peak mode at a pore diameter less than the median pore diameter. In an embodiment of the invention, the alumina compositions manifests a uni-modal pore structure exhibiting a shoulder or tailing to the right indicating a diminished secondary peak at a pore diameter greater than the median pore diameter.

Another characteristic of the inventive alumina compositions include a pore size distribution width of about 40 Å or greater. In a preferred embodiment of the invention, the pore size distribution width ranges from about 40 Å to about 120 Å.

The surface area of the alumina compositions of the invention is greater than 200 $m^2/g$ as measured by BET surface area analysis. The BET method of measuring surface area has been described in detail by Brunauer, Emmett and Teller in *J. Am. Chem. Soc.* 60 (1938) 309-316, which is incorporated herein by reference. In a preferred embodiment of the invention, the surface area of the alumina compositions of the invention ranges from about 200 $m^2/g$ to about 350 $m^2/g$.

In one embodiment of the invention, the alumina composition of the invention is prepared by a two-step precipitation process similar to the process as disclosed in U.S. Pat. Nos. 6,589,908 and 6,984,310 to form a precipitated alumina. Thereafter, but prior to calcination, the precipitated alumina is treated with a silica containing reagent to form a final silica containing alumina.

Generally, the two-step precipitation process comprises a first step wherein alumina seeds are formed under well defined temperature, pH, and flow rate conditions by the precipitation. In this first step, a first aqueous slurry containing seed alumina is formed by admixing an aqueous alkaline solution of at least one alkaline compound selected from the group consisting of sodium aluminate, potassium aluminate, ammonia, sodium hydroxide, potassium hydroxide, and combinations thereof, with an aqueous acidic solution comprising at least one acidic compound selected from the group consisting of aluminum sulfate, aluminum chloride, aluminum nitrate, sulfuric acid, hydrochloric acid, nitric acid, and combinations thereof. The mixing of the aqueous alkaline solution and aqueous acidic solution requires that either the alkaline compound of the aqueous alkaline solution or acidic compound of the aqueous acidic solution, or both of such solutions, be a compound containing aluminum. In one embodiment of the invention, a combination of aluminum sulfate and sodium aluminate reagents are preferred. Mixing of the solutions is conducted at a temperature ranging from about 45° C. to about 70° C. until about 50% of the total reactants are added. In a preferred embodiment, precipitation is conducted at a temperature ranging from about 50° C. to about 65° C. The pH of the first precipitation step should be held at a range of about 6 to about 11. In a preferred embodiment of the invention, the pH of the solution ranges from about 8 to about 10 during the first precipitation step.

The seed containing slurry produced in the first precipitation step may be transferred to a second vessel where the slurry is heated to a desired second precipitation step temperature to provide a second aqueous slurry to be used in a second precipitation step. Alternatively, the second aqueous slurry may be provided by leaving the alumina seed containing slurry produced in the first step in the first vessel while its temperature is raised to a desired second step precipitation temperature prior to further addition of the precipitation reagents.

The second precipitation step is commenced once the desired temperature is achieved. Slurry temperature for the second precipitation step should be within a range of about 48° C. to about 80° C. In a preferred embodiment of the invention, the slurry temperature for the second precipitation step ranges from about 50° C. to about 75° C.

The pH of the second precipitation step ranges from about 6 to about 11. In a preferred embodiment, the pH ranges from about 8 to about 10.

The alumina slurry obtained from the second stage is thereafter filtered and washed to remove contaminants, in particular sodium and sulfate ions. The washing process is optionally repeated until the total amount of sodium and sulfate is less than 2 wt %, preferably less than 1 wt %, of the total alumina (dry weight). In one embodiment of the invention, the pH of the second stage slurry is raised above 9, preferably about 9.5, prior to washing to remove sulfate ions. The pH is preferably raised by the addition of sodium aluminate or sodium hydroxide to the slurry.

The washed alumina is re-slurried with an aqueous solvent, preferably water, to form an aqueous alumina containing slurry. The slurry is thereafter transferred to another vessel and heated to an addition temperature ranging from about 60° C. to about 90° C. In one embodiment of the invention, the slurry is heated to an addition temperature ranging from about 70° C. to about 80° C. Following heating, a silica containing compound is added to the slurry to form a silica alumina containing slurry. The silica containing compound is added in an amount sufficient to provide the desired amount of silica in the final alumina composition.

Alternatively, the second stage precipitation slurry is left in the vessel in which the second stage precipitation is performed and its temperature adjusted to the desired addition temperature. The silica containing compound is thereafter added to the slurry in the desired amount to form a silica alumina containing slurry.

The silica alumina containing slurry is optionally peptized with a suitable peptizing agent and stirred with agitation. Suitable peptizing agents include but are not limited to nitric acid, acetic acid, citric acid, hydrochloric acid and the like. Where acetic acid is used as the peptizing agent, ammonia may be added following stirring to back titrate the final pH to about neutral.

The silica alumina containing slurry is thereafter filtered to give a silica containing alumina cake. The cake is dried at a temperature ranging from about 150° C. to 350° C. for about 30 minutes to about 4 hours to give a silica containing alumina powder. The powder is wetted with an aqueous solution, preferably water, to form an extrudable paste. The paste is extruded and dried at a temperature ranging from about 100° C. to about 200° C. for about 20 minutes to about 3 hours to give a silica containing alumina extrudate. The dried alumina extrudate is thereafter calcined at a temperature ranging from about 400° C. to about 900° C. for about 30 minutes to about 4 hours to provide a final silica containing alumina composition.

In an alternative embodiment of the invention, the alumina composition is prepared by first forming an aqueous silica containing slurry comprising an amount of a silica containing compound sufficient to provide the desired amount of silica in the final silica alumina composition. The aqueous silica containing slurry is thereafter admixed in the first precipitation step with the alkaline solution and the aqueous acidic solution under temperature and pH conditions as described herein above. In accordance with this process, a second stage addition precipitation step as described herein above is thereafter performed to obtain a silica containing alumina slurry. The silica alumina slurry is thereafter filtered, dried, extruded and calcined as described herein above to provide a final silica containing alumina composition.

It is also within the scope of the present invention to form the alumina compositions of the invention by a process wherein the alumina containing slurry obtained from the second stage precipitation as described herein above is washed and thereafter spray dried at a temperature ranging from about 350° C. to about 800° C., to provide alumina particles. The spray dried alumina particles are thereafter mixed with an appropriate amount of the silica containing compound and wetted with an aqueous solution, preferably water, to form an extrudable mixture. The mixture is thereafter extruded and dried at a temperature ranging from about 100° C. to about 200° C. for about 20 minutes to about 3 hours to give a powder. The alumina powder is calcined at a temperature ranging from about 400° C. to about 900° C. for about 30 minutes to about 4 hours to provide a final silica containing alumina composition.

Silica containing compounds useful to prepare the compositions of the invention include, but are not limited to, a homogeneous or nonhomogeneous silica alumina mixture, silica coated alumina particles, alumina coated silica particles, crystalline silica alumina (e.g. a zeolite such as beta zeolite, ZSM-5, ZSM-11, zeolite Y, USY, and the like), pure silica (e.g. colloidal silica, silica gel, silica sol, precipitated silica and the like), and combinations thereof. In a preferred embodiment of the invention, the silica containing compounds are selected from the group consisting of silica coated alumina particles, alumina coated silica particles and combinations thereof. The term "silica coated alumina particles" include silicon enriched on the surface of alumina particles, while "alumina coated silica particles" may include aluminum enriched on the surface of silica particles. An example of silica coated alumina particles useful in the present invention is Siral® 40, which is commercially available from Sasol North America Inc, of Houston, Tex. An example of alumina coated silica particles useful in the present invention is MS-25, which is commercially available from W. R. Grace & Co. of Columbia, Md. and which comprises a mixture of alumina and silica containing 75 wt % $SiO_2$, and is prepared by precipitating alumina on silica particles to form an alumina coated silica. Other silica containing compounds useful in the present invention include silica aluminas as disclosed and described in U.S. Pat. No. 6,872,685, said patent herein incorporated by reference.

For purposes of this invention, the term "homogeneous" as it refers to silica containing compounds useful in the present invention is used herein to mean a compound wherein its composition is uniformly distributed throughout the compound. The term "non-homogeneous" as it refers to a silica containing compound useful in the present invention is used herein to mean a compound wherein its composition is not uniformly distributed throughout the compound, but comprises portions wherein certain components of the composition are enriched.

Alumina compositions of the invention are useful as supports to prepare hydroconversion catalysts. While the support material of the invention may contain small amounts of other components that do not materially affect the properties of the hydroconversion catalyst, the support material should generally comprises at least 90 wt % of the silica containing alumina described herein, based on the total weight of the support. Preferably, the support material comprises at least 95 wt %, most preferably, greater than 99 wt % of the silica containing alumina, said weight percent being based on the total weight percent of the support. The support material thus can consist essentially of the silica containing alumina as described hereinabove. The phrase "consist essentially of" as used herein and in the claims with regard to the composition of the support material means that the support material may contain the silica containing alumina as described herein and other components, provided that such other components do not materially affect or influence the catalytic properties of the final hydroconversion catalyst composition.

Hydroconversion catalysts prepared from aluminas of the invention comprise at least one "catalytically active component" and the alumina support material. In the context of the present invention, "catalytically active components" include the metals themselves and/or metal compounds. The catalytically active components may also include at least one phosphorous compound. The catalytically active component may be incorporated into or onto the alumina support material by any conventional means or methods known to those skilled in the art. For instance, the metal and phosphorous components may be co-mulled with the alumina of the support during formation of agglomerate particles of the alumina support material, or the metal and/or phosphorous components may be incorporated onto the support materials by impregnation. Alternatively, the metal and phosphorous components may be incorporated into the alumina support material by a combination of methods. In a preferred embodiment of the invention, the catalytically active components are impregnated onto the alumina support material as described herein below.

Suitable impregnation procedures include, for example, spray impregnation, soaking, multi-dip procedures, and incipient wetness impregnation methods. Impregnation solutions used to impregnate the alumina support material with the desired catalytically active components comprise the desired metal, metal compound, phosphorous compound, or any combination thereof, dissolved in a suitable liquid solvent such as water, alcohol, or liquid hydrocarbon. The specific choice of metal(s), metal compounds, phosphorous compounds, promoter(s) and loadings, of course, depends upon the desired end use of the catalyst, and these variables can be readily adjusted by those of ordinary skill in the art depending upon the end use.

Typically, the catalytically active components include, but are not limited to, transition metals or compounds of transition metals selected from the group consisting of Group VIB metals, Group VIII metals and combinations thereof. The amount of the catalytic active Group VIB components, expressed as oxide, present in the hydroconversion catalyst generally will be in an amount ranging from about 10 to about 40 wt % of catalyst. In an embodiment of the invention, the Group VIB metals are present in an amount ranging from about 15 to 35 wt % of the hydroconversion catalyst. Preferably, the Group VIB metals are selected from the group consisting Mo, W and combinations thereof. More preferably, the Group VIB metal is Mo. The amount of Group VIII metals, expressed as oxide, in the hydroconversion catalyst will generally be in a range from about 1 to about 15 wt % of the conversion catalyst. In an embodiment of the invention, the Group VIII metals are present in an amount ranging from about 2 to about 10 wt % of catalyst. Group VIII metals preferably are selected from the group consisting of Ni, Co and combinations thereof. Preferably, the Group VIII metal is Ni.

In a further embodiment, the catalytic active components comprise a phosphorous component. Optionally, the hydroconversion catalyst may contain, expressed as oxide, a phosphorus compound in an amount ranging from about 0.1 to about 10 wt % of the hydroconversion catalyst. Preferably, the phosphorus compound is present in an amount ranging from about 0.5 to about 8.0 wt % of the hydroconversion catalyst. Suitable phosphorous compounds useful as catalytic active components include, but are not limited to, phosphoric acid, aluminum phosphate, and the like.

The hydroprocessing catalyst produced using the alumina compositions of the invention may be in the form of a shaped particle such as a sphere, a pill or an extrudate. In a preferred embodiment of the invention, the catalyst is in the form of an extrudate. Extrudates may be in the forms of rings, cylinders, trilobes, quadralobes, and asymmetric quadralobes.

The hydroprocessing catalysts described herein can be used for the hydroprocessing of a middle distillate and/or a heavy hydrocarbon feedstock. Advantageously, the hydroconversion catalyst provide for superior performance in the hydrodesulfurization and hydrodenitrogenation of such feedstocks.

For purposes of this invention, the terms "hydroprocessing", "hydrotreating" and "hydroconversion" are used herein interchangeably to indicate processes wherein a hydrocarbon feedstock is combined with hydrogen under pressure in the presence of a catalyst to lower: (a) the concentration of at least one of sulfur, contaminant metals, nitrogen, aromatics and Conradson carbon, present in said feedstock, and (b) at least one of the viscosity, pour point, and density of the feedstock.

For purposes of this invention, the term "middle distillate" is used herein to designate any hydrocarbon feedstock with a boiling point in a range of about 70° C. to about 400° C., preferably about 150° C. to about 350° C., and more preferably about 175° C. to about 350° C. at atmospheric pressure. Such feedstock includes, for example, diesel, crude oil distillates, coker distillates, and catalytic cracker cycle oils. The term "heavy feedstock" is used herein to include any hydrocarbon feedstock with a boiling point above about 250° C., preferably above about 350° C., including, for example, light and heavy gas oils, petroleum crude oil, tar sand hydrocarbons, and combinations thereof. The heavy hydrocarbon feedstock can also be vacuum resid or atmospheric resid component of a petroleum crude oil and/or tar sand hydrocarbon. The heavy hydrocarbon feedstock can further include high concentrations of sulfur and nitrogen compounds and metals, such as nickel and vanadium.

Hydrocarbon feedstocks useful in the present invention may also comprise sulfur compounds in amounts such that the concentration of sulfur in the middle distillate or heavy hydrocarbon feedstock exceeds about 0.5 wt % percent or even 1 wt % of the feedstock. In an embodiment of the invention, the sulfur concentration in the feedstocks ranges from about 0.5 to about 3 wt % of the feedstock. The feedstocks can further comprise nitrogen compounds in amounts such that the concentration of nitrogen in the middle distillate or heavy hydrocarbon feedstock exceeds 0.02 wt % and even exceeds 0.5 wt % nitrogen. In an embodiment of the invention, the nitrogen concentration in the middle distillate or heavy hydrocarbon feedstock ranges from about 0.03 to about 1 wt %.

Catalysts prepared according to the present invention can be used in virtually all hydroprocessing processes to treat a plurality of middle distillate and/or heavy hydrocarbon feeds under a wide-range hydroprocessing conditions. In an embodiment of the invention, the catalysts of the invention are used in a process which comprising contacting a middle distillate and/or a heavy hydrocarbon feedstock in the presence of hydrogen with the hydroconversion catalyst under suitable hydroprocessing conditions. The hydroprocessing conditions under which the middle distillate or heavy hydrocarbon feedstock is contacted with the hydroconversion catalyst include those process conditions that are effective in providing for a desired hydrotreated product. In a preferred embodiment of the invention, the conditions under which the feedstock is contacted with the hydroconversion catalyst include process conditions that are effective to reduce the sulfur and/or nitrogen content of the feedstocks. Generally, for example, at temperatures in the range of about 200° C. to about 500° C., hydrogen pressures in the range of about 5 to 300 bar, and liquid hourly space velocities (LHSV) in the range of about 0.05 $h^{-1}$ to about 10 $h^{-1}$.

The hydroconversion process of the invention can be carried out using any suitable reactor, means or system including fixed bed, moving bed, fluidized bed and ebullated bed reactor systems.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

To further illustrate the present invention and the advantages thereof, the following specific examples are given. The examples are given as specific illustrations of the claimed invention. It should be understood, however, that the invention is not limited to the specific details set forth in the examples. All parts and percentages in the examples as well as the remainder of the specification that refers to compositions or concentrations are by weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

EXAMPLES

Example 1

An alumina containing slurry was prepared as follows: To a tank was added 3600 gallons/13630 liters of city water.

The temperature was brought to 49° C. with heating. An aluminum sulfate stream and a sodium aluminate stream were added continuously to the tank under agitation. The aluminum sulfate stream consisted of an aqueous solution of aluminum sulfate (containing 8.3 wt % $Al_2O_3$, 20 gallon per minute) inline diluted with water (21.1 gallon/79.9 liter per minute), while the sodium aluminate stream was composed of an aqueous solution of sodium aluminate (containing 25.5 wt % $Al_2O_3$) inline diluted with water (35.3 gallon/134 liter per minute). The addition speed of the sodium aluminate solution in the sodium aluminate stream was controlled by the pH of the alumina slurry. The pH was controlled at 9.0 and temperature at 49° C. The temperature control was achieved through adjusting the temperature of dilution water for both streams. After 550 gallons/2082 liters of the aqueous solution of sodium aluminate were added to the tank, both aluminum sulfate and sodium aluminate streams were stopped. The temperature of the resulting slurry was increased to 53° C. with steam injection for 35 minutes. Both aluminum sulfate and sodium aluminate streams were resumed while the steam injection was kept on. During this step, the pH of the slurry was kept at 9.0, while the temperature was allowed to rise freely. The precipitation was stopped once 1200 gallons/4542 liters of the aqueous aluminum sulfate solution were added. The final temperature of the slurry reached 65° C. After the precipitation was stopped, the pH was raised with addition of the same aqueous sodium aluminate to 9.3. The alumina slurry was then filtered and washed to remove $Na^+$ and $SO_4^{2-}$. This slurry is referred to as slurry A.

After about half of slurry A was pumped to another tank, it was heated to 60-66° C. with steam injection and maintained at this temperature. MS-25 (140 lbs, 63.5 kg) was added to the tank. The amount of MS-25 was controlled so that the final support contained 3% $SiO_2$. Acetic acid (250 lbs, 113 kg, 29.2%) was subsequently added to the slurry before it was agitated for 30 minutes. After the agitation, ammonia (134 lbs, 60.8 kg, 6.06%) was added before the slurry was filtered to give a cake. The obtained cake was dried at about 288° C. to give an alumina powder containing about 60% moisture. The powder was next transferred to a mixer and treated with 0.5% nitric acid and 10% of recycle catalyst/support fines. The mixture was kept mixing until an extrudable mixture was formed. The mixture was then extruded, dried, and calcined at 732° C. to give a catalyst support.

Figure 1:
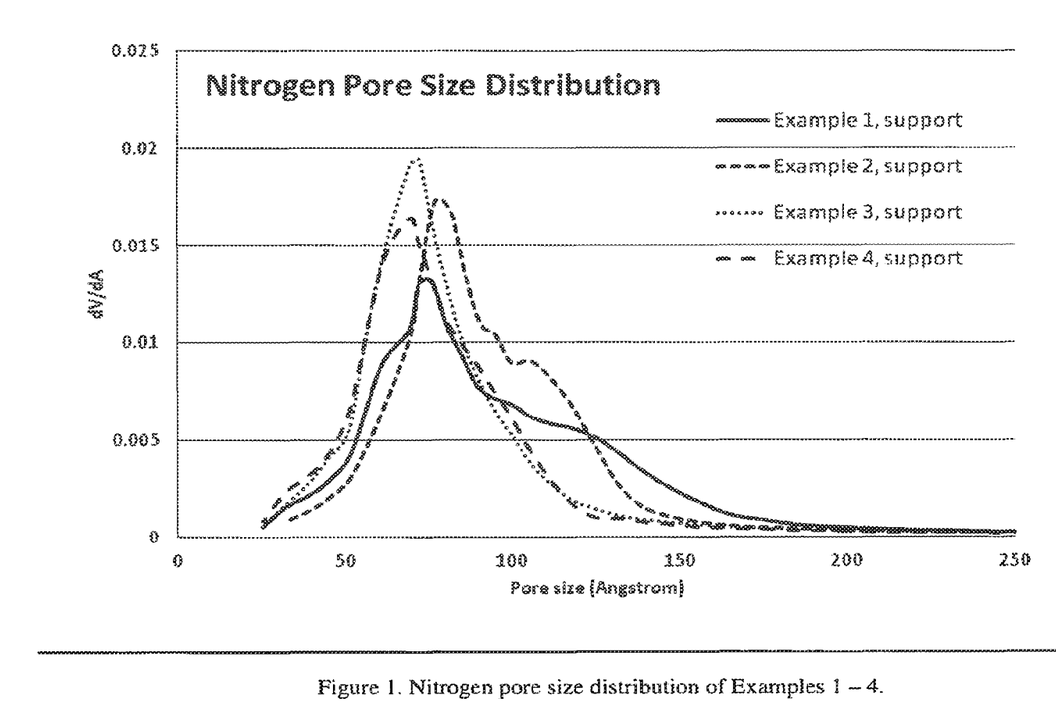
FIG. 1 presents a plot of the nitrogen pore size distribution, expressed as a function of the difference in pore volume (dV) divided by the difference in pore size (dA) versus the pore size (measured in angstroms), of catalyst supports of Examples 1 through 4.
Figure 2:
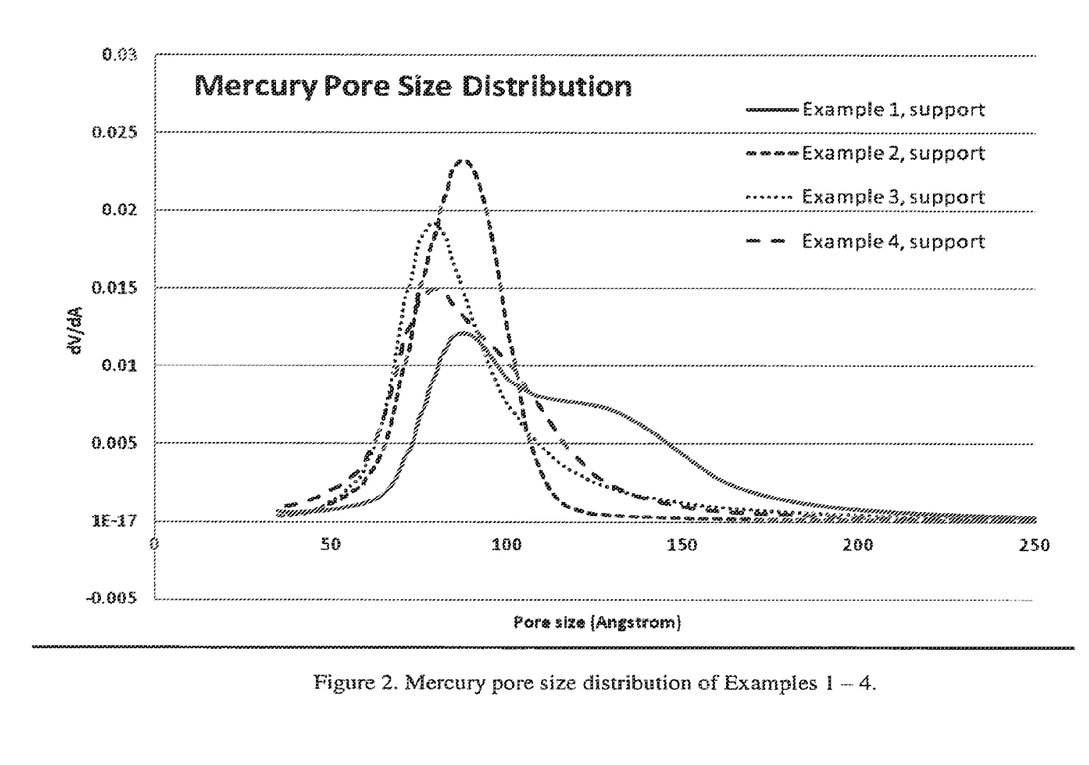
FIG. 2 presents a plot of the mercury pore size distribution, expressed as a function of the difference in pore volume (dV) divided by the difference in pore size (dA) versus the pore size (measured in angstroms), of catalyst supports of Examples 1 through 4.

The properties of the support are shown in Table 1. The nitrogen pore size distribution of the support is shown in FIG. 1, and the mercury pore size distribution of the support is shown in FIG. 2.

The support was impregnated with an aqueous Ni—Mo—P metal solution to give a catalyst containing 25.6% molybdenum oxide, 5.0% nickel oxide, and 4.5% phosphorus oxide.

Example 2

Alumina slurry A obtained from Example 1 (12.5 gallon, 47.3 liter) was taken into a tank, and it was heated to 71° C. with steam injection and maintained at the temperature. Siral® 40 (847 g), an amorphous alumina silica commercially available from Sasol, was added to the tank to give an alumina support containing 3% $SiO_2$. Glacial acetic acid (384 g) was subsequently added to the slurry, and it was followed by agitation for 30 minutes. After the agitation, ammonia (150 g, 29.0%) was added before the slurry was filtered to give a cake. The obtained cake was dried at about 288° C. to give an alumina powder containing about 60% moisture. The powder was next transferred to a mixer and kept mixing until an extrudable mixture was formed. It was next extruded, dried, and calcined at 816° C. to give a catalyst support.

The properties of the support are shown in Table 1. The nitrogen pore size distribution of the support is shown in FIG. 1, and the mercury pore size distribution of the support is shown in FIG. 2.

The support was impregnated with an aqueous Ni—Mo—P metal solution, to give a catalyst containing 25.0% molybdenum oxide, 5.0% nickel oxide, and 4.2% phosphorus oxide.

Example 3

Alumina slurry A from Example 1 (10 gallon, 37.9 liter) was taken into a tank, and it was heated to 71° C. with steam injection and maintained at that temperature. Glacial acetic acid (313 g) and beta-zeolite (267 g) were added to the tank to give a support containing 3.0% $SiO_2$. After the agitation, ammonia (184 g, 29.0%) and boric acid (474 g) were added before the slurry was filtered to give a cake. The obtained cake was dried at about 288° C. to give an alumina powder containing about 60% moisture. The powder (3.00 kg) was next transferred to a mixer kept mixing until an extrudable mixture was formed. It was next extruded, dried, and calcined at 816° C. to give a catalyst support.

The properties of the support are shown in Table 1. The nitrogen pore size distribution of the support is shown in FIG. 1, and the mercury pore size distribution of the support is shown in FIG. 2.

Example 4

Alumina slurry A from Example 1 (10 gallon, 37.9 liter) was taken into a tank, and it was heated to 71° C. with steam injection and maintained at that temperature. Glacial acetic acid (323 g) and MS-25 (974 g) were added to the tank to give support containing 8.0% $SiO_2$. After the agitation, ammonia (127 g, 29.0%) was added before the slurry was filtered to give a cake. The obtained cake was dried at about 288° C. to give an alumina powder containing about 60% moisture. The powder (3.00 kg) was next transferred to a mixer kept mixing until an extrudable mixture was formed. It was next extruded, dried, and calcined at 760° C. to give a catalyst support.

The properties of the support are shown in Table 1. The nitrogen pore size distribution of the support is shown in FIG. 1, and the mercury pore size distribution of the support is shown in FIG. 2.

TABLE 1

Alumina Support Pore Properties of Examples 1-4.

| | Example 1 | Example 2 | Example 3 | Example 4 |
|---|---|---|---|---|
| Nitrogen porosity results | | | | |
| Surface area ($m^2/g$) | 278 | 275 | 301 | 296 |
| Pore volume (p/p0 = 0.9667, cc/g) | 0.827 | 0.842 | 0.798 | 0.766 |
| Primary peak mode (Å) | 76 | 77 | 72 | 69 |
| Median pore diameter (Å) | 90 | 88 | 75 | 75 |
| Mercury porosity results | | | | |
| Total intrusion volume | 0.869 | 0.777 | 0.831 | 0.795 |

TABLE 1-continued

Alumina Support Pore Properties of Examples 1-4.

|  | Example 1 | Example 2 | Example 3 | Example 4 |
|---|---|---|---|---|
| (cc/g) | | | | |
| Primary peak mode (Å) | 88 | 88 | 79 | 80 |
| Median pore diameter (Å) | 112 | 89 | 81 | 88 |
| Pore size distribution width (Å) | 86 | 42 | 48 | 60 |

Comparative Example 1

The alumina used in this example is commercially available from W. R. Grace under the trade name of GAP-71 and is prepared at constant pH (8.8) and temperature (49° C.) with continuous flow of the aluminum sulfate and sodium aluminate streams. The flow rates of the aluminum sulfate and sodium aluminate streams are the same as slurry A in Example 1. The alumina slurry of GAP-71 was treated the same way as in Example 1 with MS-25, acetic acid and ammonia. Still in the same way as in Example 1, the mixture was filtered, dried, mixed, extruded, and calcined to give a catalyst support.

Figure 3:
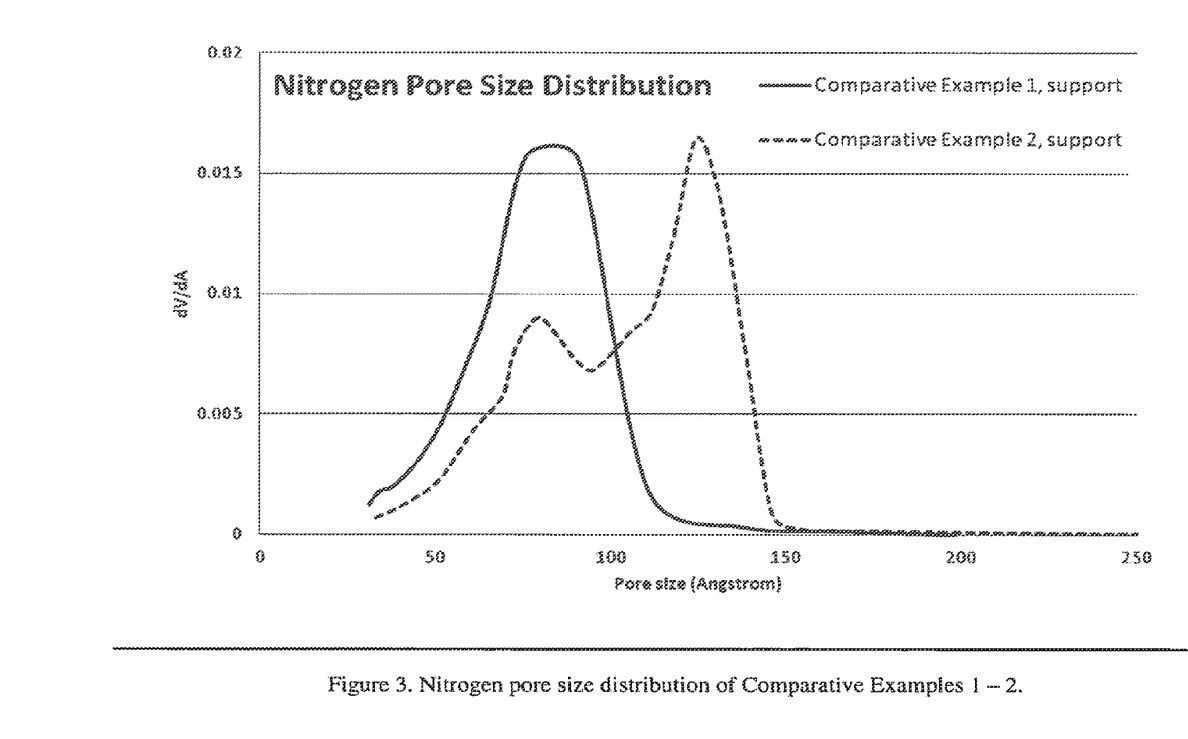
FIG. 3 presents a plot of the nitrogen pore size distribution, expressed as a function of the difference in pore volume (dV) divided by the difference in pore size (dA) versus pore size (measured in angstroms) of catalyst supports of Comparative Example 1 and Comparative Example 2.
Figure 4:
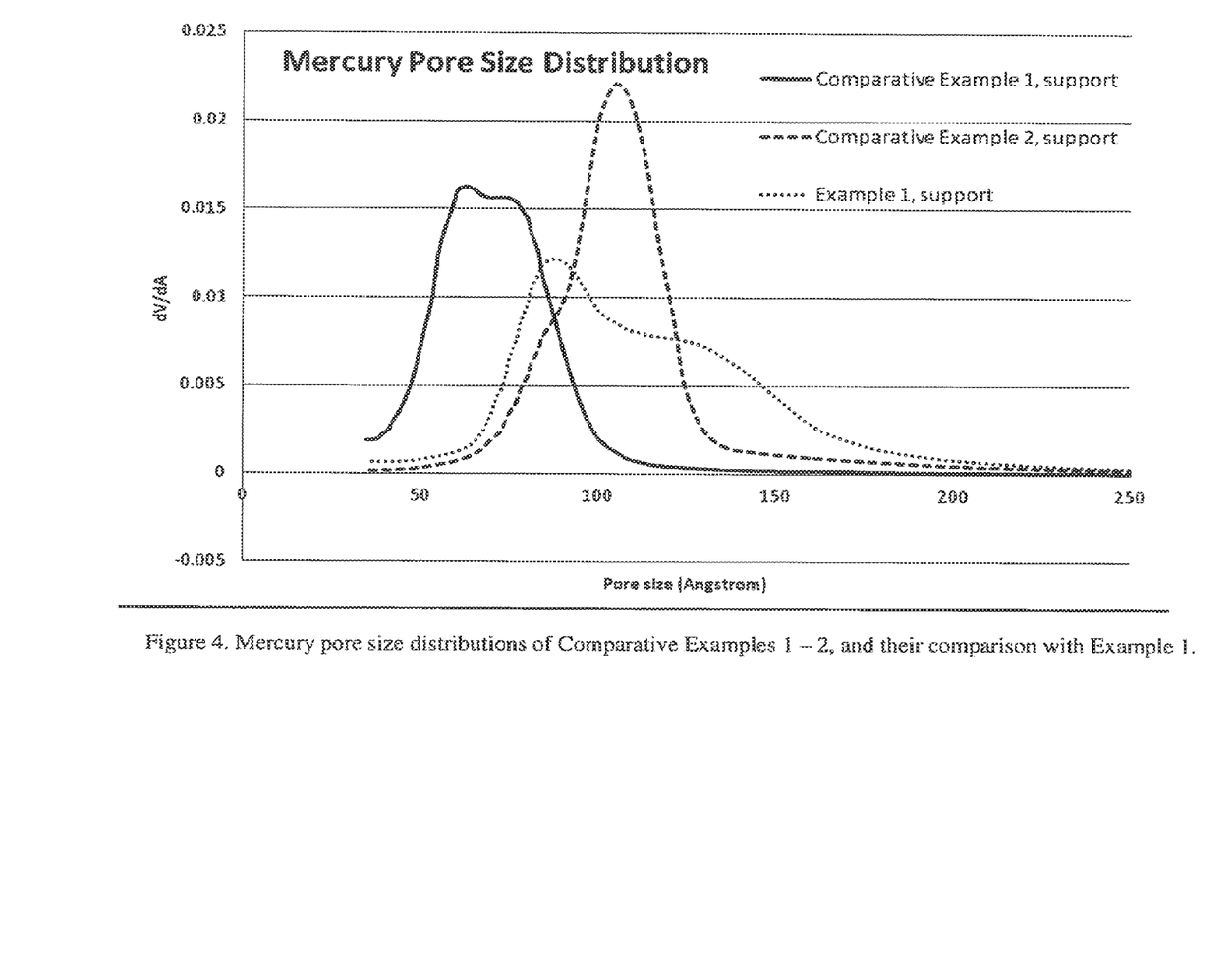
FIG. 4 presents a plot of the mercury pore size distribution, expressed as a function of the difference in pore volume (dV) divided by the difference in pore size (dA) versus pore size (measured in angstroms), of catalyst supports of Comparative Example 1, Comparative Example 2 and Example 1.

The properties of the support are shown in Table 2. The nitrogen pore size distribution of the support is shown in FIG. 3, and the mercury pore size distribution of the support is shown in FIG. 4.

The support was impregnated with an aqueous Ni—Mo—P metal solution, to give a catalyst containing 25.0% molybdenum oxide, 5.0% nickel oxide, and 4.0% phosphorus oxide. The catalyst was used as a testing standard with hydrodesulfurization (HDS) relative volume activity (RVA) =100.

TABLE 2

Alumina Support Pore Properties

|  | Comparative Example 1 | Comparative Example 2 |
|---|---|---|
| Nitrogen porosity results | | |
| Surface area (m²/g) | 275 | 246 |
| Pore volume (p/p0 = 0.9667, cc/g) | 0.753 | 0.837 |
| Primary peak mode (Å) | 76 | 124 |
| Median pore diameter (Å) | 82 | 110 |
| Mercury porosity results | | |
| Total intrusion volume (cc/g) | 0.669 | 0.839 |
| Primary peak mode (Å) | 71 | 106 |
| Median pore diameter (Å) | 63 | 104 |
| Pore size distribution width (Å) | 47 | 41 |

Comparative Example 2

This example provides a support and catalyst without treatment of chemical reagents after the alumina slurry formation. It was prepared following the procedures described in U.S. Pat. No. 6,984,310 B2 without chemical reagent treatment. The properties of the support are shown in Table 2, the nitrogen pore size distribution is shown in FIG. 3, and the mercury pore size distribution is shown in FIG. 4. Its pore size distribution falls into the claim description of U.S. Pat. No. 6,984,310 B2. The mercury pore size distribution is also compared with that of Example 1 in FIG. 4, which clearly shows that Example 1 has a diminished tailing to the right side, while Comparative Example 2 has a major peak to the right side. The diminishing peak to the right in Example 1 suggests that the addition of additives is effective to reduce most of the intensity of the major peak in Comparative Example 2.

The support was impregnated with a typical aqueous metal solution, to give a catalyst containing 24.9% molybdenum oxide, 5.0% nickel oxide, and 4.2% phosphorus oxide.

Example 5

The catalysts prepared in Examples 1 and 2 and Comparative Examples 1 and 2 were tested for ultra low sulfur diesel (ULSD) applications to evaluate hydrodesulfurization (HDS) and hydrodenitrogenation (HDN) performance with a diesel feedstock. The testing conditions and feed are summarized in Table 3, and their testing results are summarized in FIG. 5. The catalyst prepared in Comparative Examples 1 was used as a testing standard with hydrodesulfurization (HDS) and hydrodenitrogenation (HDN) relative volume activity (RVA) both at 100.

TABLE 3

Testing conditions for USLD applications

|  | Value |
|---|---|
| Testing conditions | |
| Catalyst amount (cc) | 8.70 |
| LHSV (h$^{-1}$) | 1.5 |
| Temperature (° C.) | 343 |
| Total pressure (psi) | 800 |
| H$_2$/oil (scf/bbl) | 5500 |
| Recycle gas | No |
| Feedstock | |
| Feed | Diesel |
| API gravity | 23.4 |
| Sulfur (wt %) | 1.86 |
| Nitrogen (ppm) | 580 |

Figure 5:
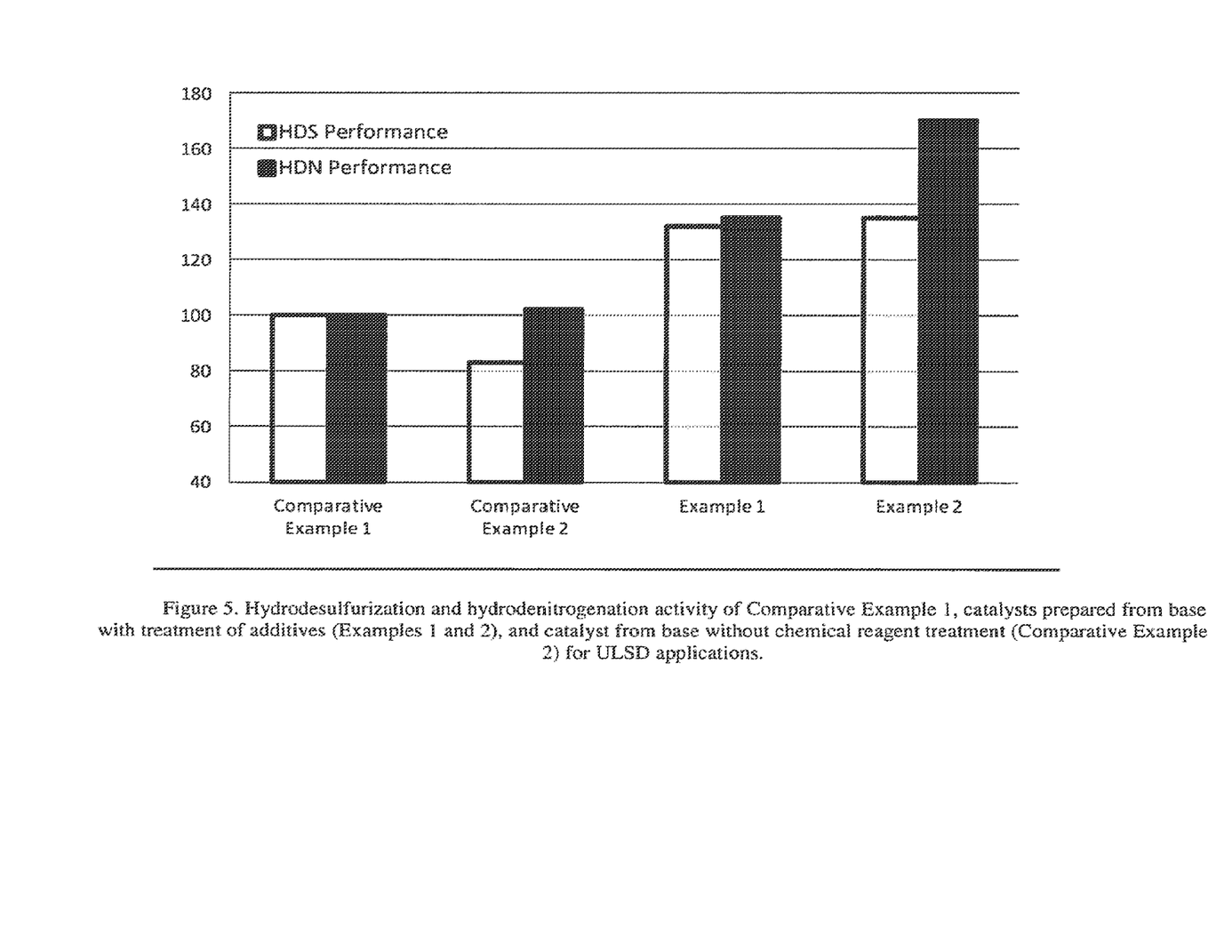
FIG. 5 is a graphic representation of the performance of catalysts prepared in Comparative Example 1, Comparative Example 2, Example 1 and Example 2, respectively, for hydrodesulfurization (HDS) and hydrodenitrogenation (HDN) in ultra-low sulfur diesel (ULSD) applications.

As shown in FIG. 5, catalysts prepared in Examples 1 and 2 showed enhanced HDS and HDN activities for ULDS applications when compared to catalysts prepared in Comparative Examples 1 and 2. The catalyst of Comparative Example 2, without the addition of additive, exhibited a pore size distribution (PSD) similar to that obtained from the catalyst as described in U.S. Pat. No. 6,984,310 and gave a HDS performance which was less active than the standard. The HDN activity was comparable to the standard.

Example 6

Figure 6:
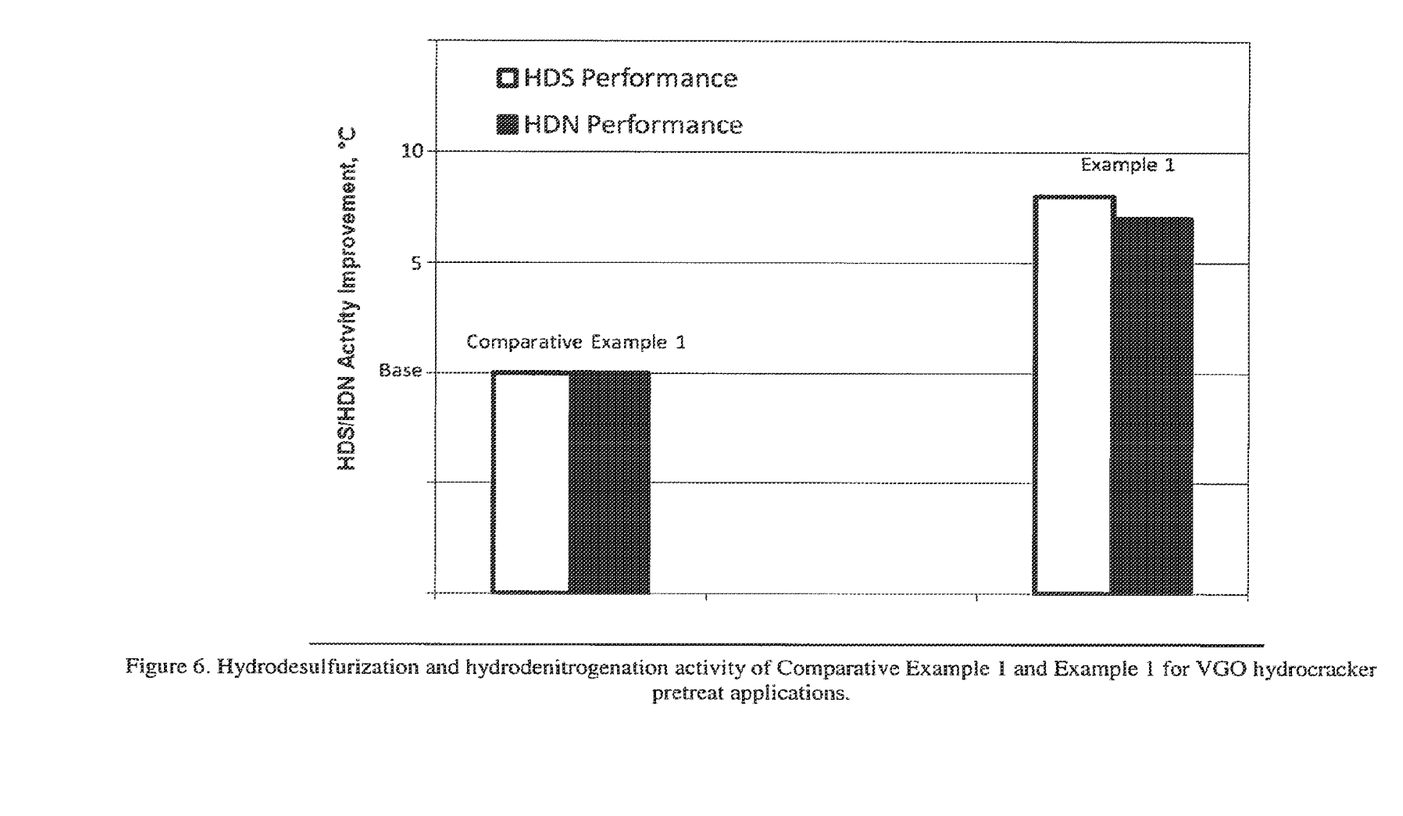
FIG. 6 is a graphic representation of the performance of catalysts prepared in Comparative Example 1 and Example 1, respectively, for hydrodesulfurization and hydrodenitrogenation in vacuum gas oil (VGO) hydrocracker pretreat applications.

Catalysts prepared in Example 1 and Comparative Example 1 were also evaluated for hydrodesulfurization (HDS) and hydrodenitrogenation (HDN) performance with a vacuum gas oil (VGO) feedstock. The testing conditions and feed are summarized in Table 4 below. The testing results are shown in FIG. 6. Comparative Example 1 was used as the testing standard with HDS and HDN relative volume activity (RVA) both at 100.

TABLE 4

Testing conditions for VGO applications

| Testing conditions | Value |
|---|---|
| Catalyst amount (cc) | 6.0 |
| LHSV (h$^{-1}$) | 2.0 |
| Temperature (° C.) | 371-382 |
| Total pressure (psi) | 2300 |
| H$_2$/oil (scf/bbl) | 5500 |
| Recycle gas | No |
| Feedstock | |
| Feed | VGO |
| API gravity | 21.1 |
| Sulfur (wt %) | 2.26 |
| Nitrogen (ppm) | 1143 |
| Boiling point range (° C.) | 332-574 |

As shown in FIG. 6, the catalyst prepared in accordance with Example 1 exhibited improved HDS and HDN activities when compared to the catalyst prepared in Comparative Example 1. This suggested that the treatment of the alumina support with a silica containing additive provided improved activity for HDS and HDN for a VGO feedstock.

What is claimed is:

1. An alumina catalyst support composition which comprises calcined precipitated alumina comprising from about 3 to about 10 wt % silica, said composition having a pore volume of about 0.60 cc/g or greater, a median pore diameter ranging from about 70 Å to about 120 Å, a pore size distribution such that at least about 90% of the total pore volume falls within the range of about 20 Å to about 250 Å, a pore size distribution width of about 40 Å or greater, wherein the term "pore size distribution width" is used to indicate the smallest range of pore diameters of the pores of the silica containing alumina composition in which is present two-thirds of the total pore volume of the silica containing alumina material, and a unimodal pore distribution, the distribution expressed as a function of the difference in pore volume, dV, divided by the difference in pore size, dA, and referred to as incremental pore volume, dV/dA, is plotted versus pore size measured in Angstroms (Å), the unimodal distribution having a single or primary peak mode and exhibiting a shoulder on the primary peak mode, indicating the presence of a secondary peak of diminished size relative to the primary peak mode and present at a pore diameter greater than the median pore diameter;

wherein pore volume and pore size distribution properties are determined by mercury penetration porosimetry at a pressure range from atmospheric to about 60,000 psi, a contact angle Θ=140° and a mercury surface tension of 474 mN/m at 25° C.; and wherein a unimodal pore distribution of the alumina composition is characterized by the presence of no more than one maximum peak when incremental pore volume of the alumina is plotted as a function of pore diameter; and wherein the support composition does not contain catalytically active metals.

2. The alumina catalyst support composition of claim 1, wherein the composition has a total pore volume of about 0.60 cc/g to about 1.0 cc/g.

3. The alumina catalyst support composition of claim 2, wherein the pore size distribution width ranges from about 40 Å to about 120 Å.

4. The alumina catalyst support composition of claim 3, wherein from about 90 to about 95% of the total pore volume falls within the range of about 20 Å to about 250 Å.

5. The alumina catalyst support composition of claim 1, wherein the pore volume and pore size distribution properties are determined by mercury penetration porosimetry using a mercury porosimeter at a pressure range from about atmospheric pressure to about 60,000 psi, with a contact angle, θ=140° and a mercury surface tension of 474 mN/m at 25° C.

6. A catalyst composition suitable for use in the hydroconversion of a middle distillate or a heavy hydrocarbon feedstock, said catalyst composition comprising a support comprised of calcined precipitated alumina composition comprising from about 3 to about 10 wt % SiO$_2$, wherein the support has a pore volume of about 0.60 cc/g or greater, a median pore diameter ranging from about 70 to about 120 Å, a pore size distribution such that at least about 90% of the total pore volume falls within the range of about 20 Å to about 250 Å, and a pore size distribution width of about 40 Å or greater, wherein the term "pore size distribution width" is used to indicate the smallest range of pore diameters of the pores of the silica containing alumina composition in which is present two-thirds of the total pore volume of the silica containing alumina material, and a unimodal pore distribution, the distribution expressed as a function of the difference in pore volume, dV, divided by the difference in pore size, dA, and referred to as incremental pore volume, dV/dA, is plotted versus pore size measured in Angstroms (Å), the unimodal distribution having a single or primary peak mode and exhibiting a shoulder on the primary peak mode, indicating the presence of a secondary peak of diminished size relative to the primary peak mode and present at a pore diameter greater than the median pore diameter; and at least one impregnated catalytically active component selected from the group consisting of: (i) an oxide of a Group VIB metal component selected from Mo and W; (ii) an oxide of a Group VIII metal component selected from Ni and Co; and combinations thereof, said catalytically active component containing an oxide of a phosphorous component;

wherein pore volume and pore size distribution properties are determined by mercury penetration porosimetry at a pressure range from atmospheric to about 60,000 psi, a contact angle θ=140° and a mercury surface tension of 474 mN/m at 25° C.; and wherein a unimodal pore distribution of the alumina composition is characterized by the presence of no more than one maximum peak when incremental pore volume of the alumina is plotted as a function of pore diameter.

7. The catalyst composition of claim 6, wherein the support material has a total pore volume of about 0.60 to about 1.0 cc/g.

8. The catalyst composition of claim 7, wherein said Group VIB metal component is present as an oxide in said catalyst composition in the range of from about 10 wt % to about 40 wt %; said Group VIII metal component is present as an oxide in said catalyst composition in the range of from about 1 wt % to about 15 wt %; and said phosphorus component is present as an oxide in said catalyst composition in the range of from about 0.1 wt % to about 10 wt %, as oxide, and all wt % being based on the total weight of said catalyst composition.

9. The catalyst composition of claim 6, wherein from about 90 to about 95% of the total pore volume falls within the range of about 20 Å to about 250 Å.

10. The catalyst composition of claim 9, wherein the pore size distribution width ranges from about 40 Å to about 120 Å.

11. A method of hydroprocessing a middle distillate or a heavy hydrocarbon feedstock, said method comprising contacting under hydrodesulfurization and hydrodenitrogenation conditions said feedstock with a catalyst of claim 6.

* * * * *